Feb. 7, 1967   B. SILVER   3,302,890
ROCKET NOZZLE

Filed July 10, 1964   2 Sheets-Sheet 1

INVENTOR

BERNARD SILVER

BY *Laurence R. Hefter*

ATTORNEY

Feb. 7, 1967 B. SILVER 3,302,890
ROCKET NOZZLE
Filed July 10, 1964 2 Sheets-Sheet 2

INVENTOR
BERNARD SILVER
BY Lawrence R. Hajter
ATTORNEY

United States Patent Office

3,302,890
Patented Feb. 7, 1967

3,302,890
ROCKET NOZZLE
Bernard Silver, Alexandria, Va., assignor to Atlantic Research Corporation, a corporation of Virginia
Filed July 10, 1964, Ser. No. 381,669
17 Claims. (Cl. 239—265.31)

This invention relates to rocket motor exhaust nozzles, and more particularly, to axial-thrust modulating rocket exhaust nozzles.

In various scientific and military rocket applications it is often desirable to have the capability of being able to vary the axial thrust level of a rocket motor either manually prior to launch or remotely prior to launch and/or during flight. This capability provides maximum efficiency in permitting the manufacture and storage of a single type of rocket motor having fixed combustion chamber operating characteristics and various flight performance characteristics which can be easily and accurately selected. Furthermore, the use of a single rocket motor offers maximum reliability, predictability, and reproducibility since the basic propulsion unit is a constant parameter and the only variation needed to achieve different thrust levels is a minor mechanical modification of a portion of the rocket nozzle. For maximum flexibility in the control of the rocket motor's flight performance it is often preferable to employ a variable thrust rocket nozzle capable of manual and remote control.

Many prior art variable thrust rocket motors operate on the principle of varying thrust by varying the exhaust port area. An indication of such a variation is transmitted upstream from the nozzle into the combustion chamber in the form of a pressure variation. Since burning time and operating characteristics of solid and semi-solid propellants vary with the combustion chamber pressure, in order to maintain constant burning characteristics the combustion chamber pressure must remain constant. It is desirable to maintain the propellant burning characteristics constant as this provides performance reproducibility and reliability. In liquid propellant rockets the fuel pumping pressure is, in part, dependent upon the combustion chamber pressure and if this pressure remains constant the fuel-feed system design and operations are considerably simplified. Therefore, with these considerations in mind, the prior art variable area exhaust nozzles are often undesirable.

Other variable thrust nozzles employ movable vanes or deflectors to vary the direction of exhaust gas flow. These often require expensive, complicated, and weighty systems to mount and position the vanes or deflectors properly and, therefore, are often unsatisfactory.

Accordingly, it is one object of the present invention to provide a rocket nozzle which varies the axial thrust without affecting the rocket motor combustion chamber pressure.

Another object of this invention is to provide a rocket nozzle which is capable of manual and remote in situ adjustment for presetting the desired flight performance of a rocket motor.

A still further object of the present invention is to provide a rocket nozzle capable of automatic variation of flight performance in accordance with a predetermined programmed sequence.

Further objects and attendant advantages will be better understood from the following description.

Briefly stated, the present invention, in one form, comprises a rocket nozzle including an exhaust gas-receiving hollow plug member and a housing movably mounted on the plug member. The plug member has a rearwardly directed aperture through one end thereof and a plurality of equally circumferentially spaced, laterally directed apertures through the side wall thereof. The housing similarly has a rearwardly directed exhaust port in the shape of a conventional converging-diverging nozzle and a plurality of equally circumferentially spaced, laterally directed exhaust ports corresponding in number to the laterally directed apertures of the plug member. A projection is provided at the rear end of the plug member which cooperates with the housing exhaust port to vary the area of the exhaust port as the housing is moved relative to the plug member. Simultaneous with the variation in area of the rearwardly directed exhaust port is the variation in alignment between the laterally directed exhaust ports and laterally directed apertures in order to maintain the sum total effective exhaust area equal to a fixed value. For example, when the projection is in a non-obstructing position relative to the rearwardly directed exhaust port, i.e., position of maximum rearwardly directed exhaust port area, the laterally directed ports and apertures are completely out of relative alignment thus obturating the apertures and laterally directed ports and forcing all exhaust gases to flow through the rearwardly directed aperture and exhaust port. In the other extreme, when the projection is in such a position as to obturate the rearwardly directed exhaust port the laterally directed apertures and exhaust ports are in complete alignment and the exhaust gases flow laterally thus minimizing the axial thrust level. By causing the housing to take an intermediate position between these two extremes any desired intermediate axial thrust level can be achieved.

It should be noted that the expression "effective exhaust area" as used above and throughout this specification refers to the actual cross-sectional exhaust area modified by design efficiency considerations, such as the nozzle discharge coefficient.

Another embodiment of the present invention comprises a housing having a pair of chambers therein separated by a partition or wall having an opening therethrough. An exhaust port is provided through one end wall of the housing which communicates with one of the chambers thus providing one of the chambers with an opening through each of its end walls. A movable plug member is mounted within that chamber such that translational movement of the plug member toward either opening effects partial obturation of that opening and decreases the obturation of the other opening, or, in other words, the variation in area of one opening is inversely proportional to the variation in area of the other opening. A plurality of laterally directed ports are provided through the side wall of the housing and communicate with the second chamber. Exhaust gases are caused to flow into the first-described chamber either by directing exhaust gases from a combustion chamber thereto by burning the fuel in the first chamber. Maximum axial thrust is provided by causing the plug member to obturate the opening through the partition and providing maximum area of the exhaust port. Axial thrust is eliminated by causing the plug member to obturate the rearwardly directed exhaust port thus increasing the area of the opening between the two chambers. Exhaust gases will flow through this opening into the second chamber and then laterally outwardly thus decreasing the axial thrust level. Any intermediate axial thrust level is obtainable by merely causing the plug member to take a position intermediate the two above-described extreme positions. As with the first embodiment briefly described above, the sum total effective exhaust area remains equal to a fixed value regardless of the position of the plug member.

While the specification concludes with claims particularly pointing out and distinctly claiming the subject matter which is regarded as the invention, it is believed that the invention will become better understood from the following description taken in combination with the accompanying drawings in which:

Figure 1:
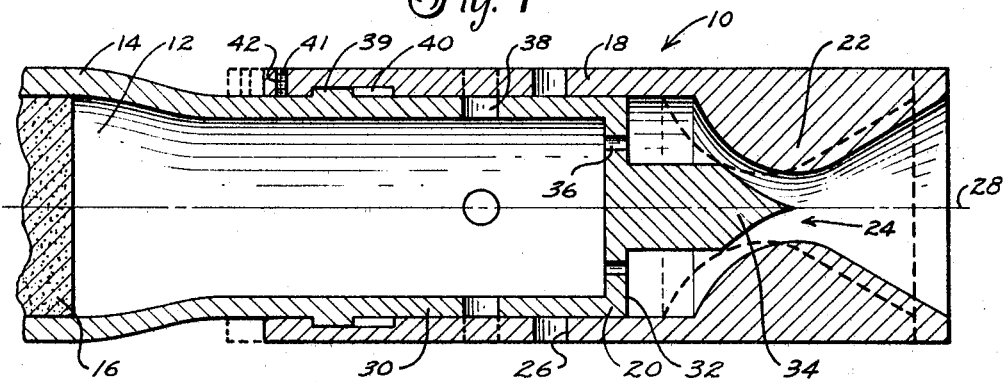
FIGURE 1 is a sectional view of an axial-thrust modulating rocket exhaust nozzle formed in accordance with the first embodiment of this invention.

With reference to the drawings, and more particularly to FIGURE 1, there is shown an axial-thrust modulating rocket exhaust nozle 10 formed in accordance with the first embodiment of this invention attached to and in flow communication with the combustion chamber 12 of a rocket motor partially and generally shown at 14. For illustrative purposes, the rocket motor with which the subject nozzle is shown is of the solid propellant type wherein the solid grain 16 is located within the combustion chamber 12 and the exhaust gases from the burning of the grain 16 exit through the axial-thrust modulating exhaust nozzle 10. While the grain is partially illustrated as being of the end-burning type, it should be noted that neither the grain nor the rocket motor itself constitute part of this invention and, therefore, the particular configuration shown or discussed below should not be considered limiting since any rocket motor may be utilized with the subject nozzle.

The exhaust nozzle 10 comprises two primary elements, a housing 18 and an exhaust port area varying means 20 located within the housing 18. The housing 18 is of a generally cylindrical shape and includes a conventional converging-diverging nozzle 22 at the rear end thereof which provides a rearwardly directed exhaust port 24 for the exhaust nozzle 10. The housing also includes a plurality of equally circumferentially spaced, laterally directed exhaust ports 26 extending through the side wall thereof. These laterally directed exhaust ports 26 can extend radially outwardly or can be inclined to the axis 28 of the exhaust nozzle 10. If the ports extend radially outwardly the non-axial thrust components at each of the ports 26 will be counterbalanced resulting in lateral thrust negation. If the ports 26 are inclined tangentially, they will impart spin to the rocket motor. If the ports are forwardly inclined they will serve as thrust reversers. In fact, any desirable thrust vector orientation can be obtained by proper direction of the laterally directed ports 26.

The exhaust port area varying means 20 comprises a hollow plug member 30 of generally cylindrical shape having an end wall 32 adjacent the rearward end of the housing 10. A projection 34 extends rearwardly from the downstream side of the end wall 32. The rearward end of the projection 34 has a general conical shape to generally conform to the converging and throat portions of the exhaust port 24 to permit gradual obturation of the exhaust port 24. Surrounding the projection 34 are a plurality of rearwardly extending exhaust apertures 36 which extend through the rear wall 32 to form, in combination with the exhaust port 24, the rearwardly directed exhaust flow path. The plug member 30 further includes a plurality of equally spaced, laterally extending apertures 28 which correspond to the similarly directed exhaust ports 26 of the housing 18.

The housing 18 is mounted on and about the plug member 30 so as to permit longitudinal relative motion therebetween. The laterally directed apertures 38 and exhaust ports 26 are located so as to permit alignment therebetween to form a laterally directed exhaust gas flow path at a time coincident with the maximum desired obturation of the exhaust port 24 by the rearwardly extending projection 34. Similarly, the laterally directed apertures 38 and exhaust ports 26 are located as to permit complete misalignment or divorcement thereof at a time coincident with the minimum obturation of the exhaust port 24. Furthermore, the cross-sectional area of each of the laterally directed exhaust ports is variable in a manner inversely proportional to the variation in cross-sectional area of the exhaust port 24 such that at all times the sum total effective exhaust area, of the rearwardly directed exhaust port 24 and the laterally directed exhaust ports 26, is always substantially equal to a fixed value. This will permit variation of the axial thrust level without affecting the pressure in the rocket motor combustion chamber 12. It should be noted that due to efficiency considerations (nozzle discharge coefficient) the sum total of the actual (i.e., the dimensional) cross-sectional areas may not be constant; however, when the nozzle discharge coefficient is considered, the sum total effective exhaust area is constant.

Figure 1A:
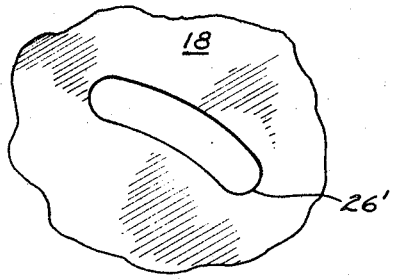
FIGURE 1A is a modification of the shape of the laterally directed exhaust ports of the first embodiment.

Relative motion between the housing 18 and the plug member 30 can be effected by any conventional means. For example, as shown in FIGURE 1 the housing 18 is mounted upon the plug member 30 through the use of axial splines 39 on the plug member 30 and grooves 40 in the housing 18 thereby permitting relative axial motion therebetween by merely sliding the housing 18 along the plug member. However, similar results can be obtained by providing a threaded engagement (not shown) between the housing 18 and the plug member 30. The laterally directed apertures 38 and exhaust ports 26 may have a circular cross-section as shown in FIGURE 1 or, if the threaded mounting means is employed, they may preferably have an elongated curvature as shown by the ports 26' in FIGURE 1A. This will permit partially and gradually increasing the alignment of the apertures 38 and ports 26 during rotation of the housing 18 relative to the plug member 30. Any conventional clamping means, such as a set screw 41 extending through an opening 42 in the housing wall, is provided to permit locking of the housing 18 in the desired relative position.

In operation, the maximum axial thrust level is obtained when the housing 18 is in an extreme rearward position as shown by the solid lines in FIGURE 1. When the housing is in this first position the laterally directed apertures 38 and exhaust ports 26 are in complete misalignment thus eliminating any lateral exhaust gas flow path. Furthermore, the projection 34 is spaced furthest from the exhaust port 24 to provide the maximum effective exhaust area of the rearwardly directed exhaust port 24. Gradual axial movement of the housing 18 inwardly toward the combustion chamber 12 causes partial alignment of the laterally directed apertures 38 and exhaust ports 26, and at the same time causes the projection 34 to partially obturate the rearwardly directed exhaust port 24. In this intermediate position, a small portion of the exhaust gases flows laterally outwardly through the apertures 38 and exhaust ports 26 while the remainder of the exhaust gases continues to flow rearwardly through the rearwardly directed apertures 36 and exhaust port 24. The effective exhaust area of the aligned portion of the laterally directed apertures 38 and exhaust ports 26 plus the effective exhaust area of the rearwardly directed exhaust port 24 is equal to the effective exhaust area of the rearwardly directed exhaust port 24 alone when it was in the above-described maximum axial thrust level position. A third position, illustrating the minimum axial thrust level, is shown by the dotted lines in FIGURE 1, where the laterally directed apertures 38 and exhaust ports 26 are in complete alignment and the rearwardly extending projection 34 provides for complete obturation of the rearwardly directed exhaust port 24. In this third position the sum total of the effective exhaust area of the laterally directed apertures 38 and the effective exhaust area of rearwardly directed exhaust port 24 is also equal to the effective exhaust area of the rearwardly directed exhaust port 24 alone when it was in the above-described maximum axial thrust level position. It can thus be seen that no matter what position the housing 18 is in relative to the plug member 30 the sum total effective exhaust area is always equal to a fixed value albeit the axial thrust level varies.

Figure 2:
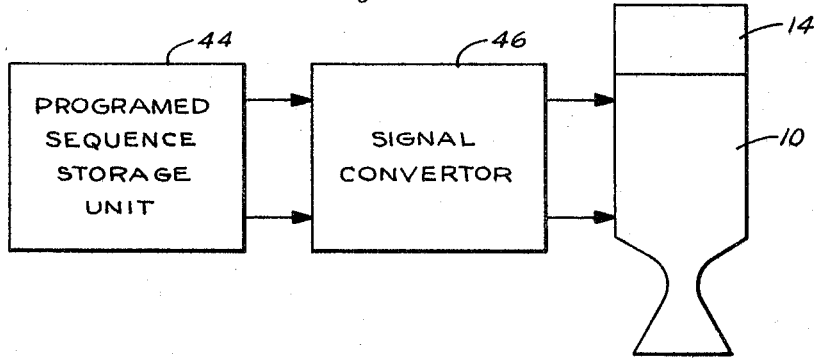
FIGURE 2 is a schematic illustration of a remote-controlled axial-thrust modulating rocket exhaust nozzle formed in accordance with this invention.

Movement of the housing 18 relative to the plug member 30 may be accomplished manually or remotely by any of their respective conventional means (not shown). For example, rotation or translation of the housing 18 may be remotely accomplished by any conventional mechanical motor and gearing arrangement or pneumatic or hydraulic device. Furthermore, the rotation or translation of the housing 18 may be remotely accomplished by any conventional electrical or magnetic means such as by electromagnetic solenoid means. Because the actuation of the housing 18 can be remotely accomplished a complete programmed sequence axial thrust level variation can be recorded or encoded in a storage unit 44 and fed through a signal converter 46 to the appropriate housing actuating means as shown by the schematic illustration in FIGURE 2. This will permit continued variation of the axial thrust level in accordance with a predetermined program and this continued variation may be accomplished completely automatically.

Figure 4:
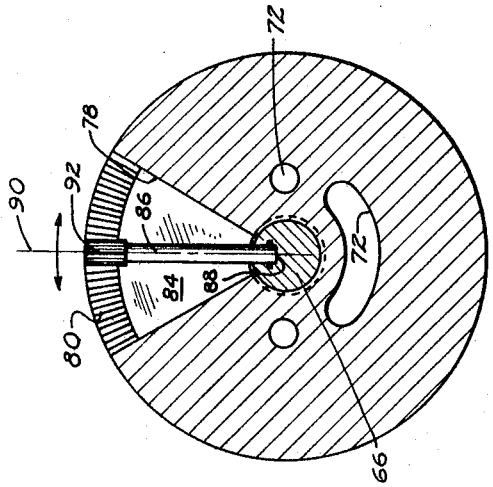
FIGURE 4 is a sectional view taken along the lines 4—4 of FIGURE 3.
Figure 3:
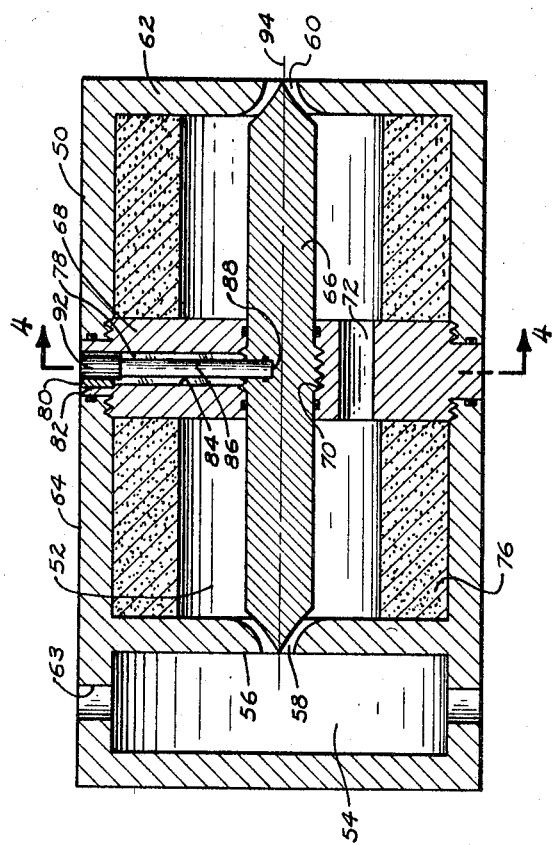
FIGURE 3 is a sectional view of an axial-thrust modulating rocket exhaust nozzle formed in accordance with the second embodiment of this invention.

A second embodiment of the present invention is illustrated in FIGURES 3 and 4 and comprises a nozzle housing 50 including a pair of chambers 52, 54, therein separated by a partition 56. A bell mouth opening or aperture 58 is provided through the partition 56 and a rearwardly directed exhaust port 60, coaxial with the opening 58, is provided through the end wall 62 of the first chamber 52. A plurality of laterally directed, evenly circumferentially spaced exhaust ports 63 are provided through the side wall 64 of the housing 50 and communicate with the second chamber 54. As was discussed above with reference to the first embodiment, proper orientation of the laterally directed ports 63 can produce a spin effect on the rocket motor, thrust reversal or complete lateral equilibrium. Plug means 66 for varying the area of the opening 58 and exhaust port 60 is mounted within the first chamber 52 coaxial with the opening 58 and exhaust port 60. The plug 66 is mounted so as to permit translational motion relative to the end wall 62. It can be seen that movement of the plug 66 toward or away from the end wall 62 will provide variation in the effective cross-sectional area of the exhaust port 60 and the opening 58 in an inverse relationship relative to each other. The plug is supported within the chamber 52 by means of a centrally located support ring 68 having an internally threaded bore 70 passing centrally therethrough. The central portion of the plug 66 is externally threaded and received by the bore 70 to permit rotation therebetween thus causing translation of the plug 66 relative to the end wall 62. A plurality of apertures 72 extend longitudinally through the support ring 68 in order to provide complete flow communication between both sides of the ring member 68 within the chamber 52.

The rocket motor exhaust gases are caused to flow into the first chamber 52 by either providing duct means (not shown) from the combustion chamber to the first chamber 52 or by supplying fuel to and burning the fuel in the first chamber 52. For illustration, there is shown in FIGURE 3 a propellant grain 76 within the first chamber 52. When the maximum axial thrust level is desired the plug 66 is located in the first position whereby it obturates the opening 58 in the partition 56. The entire quantity of exhaust gases flows rearwardly through the rearwardly extending exhaust port 60. The axial thrust level can be reduced to any desired level by merely causing the plug 66 to translate rearwardly and obturate the rearwardly extending exhaust port 60 the prescribed amount thus causing a portion of the exhaust gases to flow through the opening 58 in the partition 56 and then laterally outwardly through the exhaust ports 63. In order to maintain pressure in the combustion chamber constant, however, it is necessary that the sum total of the effective exhaust area of the rearwardly extending exhaust port 60 and the opening 58 remain equal to a fixed value, that value being equal to the effective exhaust area of the rearwardly extending exhaust port 60 when the plug 66 is in the position to provide maximum axial thrust.

Figure 5:
FIGURE 5 is a perspective view of the sector gear employed in the second embodiment.

Translation of the plug can be effected by manual control means, one example of which is illustrated in FIGURES 3-5. A slot 78 is cut radially through the support ring 68 and extends inwardly sufficiently far so as to communicate with the outer surface of the plug member 66. The slot 78 has an arcuate length determined by the desired amount of rotation of the plug member 66 as explained below. A sector gear 80, having an arcuate length equal to that of the slot 78, is mounted in a groove 82 provided in the surface of one of the walls 84 of the slot 78. Cooperating with the sector gear 82 is a rod 86 which is received within a cylindrical cavity 88 extending partially radially through the plug member 66. The rod is so received as to permit rotation thereof about its longitudinal axis 90. A plurality of longitudinal teeth or splines 92 are formed on the surface of the rod 86 and coact with the teeth of the sector gear 80 such that rotation of the rod 86 about its longitudinal axis 90 causes the rod to "walk" along the sector gear 80 thus causing the plug member 66 to rotate about its longitudinal axis 94. Due to the threaded relationship between the plug member 66 and the support ring 68, rotation of the plug member causes it to translate relative to the end wall 62. The length of the slot 78 is sufficient to allow the plug member 66 and rod 78 to rotate about axis 94 the necessary amount to provide the required length of translation of the plug member 66. The sector gear 80 is tapered, as shown in FIGURE 5, to account for the translation of the rod 78 ensuring continued interengagement of the sector gear teeth and the rod teeth. Rotation of the rod 86 may be produced by various means, for example, by providing a slot in the end thereof to receive a torque-producing tool.

Since thrust control is achieved by merely causing translation of the plug member 66 relative to the end wall 62 it is clear that actuation of the plug member 66 can be remotely controlled by a system (FIGURE 2) similar to that discussed above with respect to the first embodiment. As was discussed above, a mechanical, hydraulic, pneumatic, electrical, or magnetic system can be used to accurately position the plug member 66 relative to the exhaust port 60.

Axial-thrust modulating rocket exhaust nozzles formed in accordance with the principles described above effectively and accurately vary the axial thrust levels with a minimum of effort and, due to the maintenance of a constant sum total effective exhaust area, provide constant operating conditions within the rocket motor combustion chamber.

While two specific embodiments have been shown and described above, it will be obvious to those skilled in the art that various changes and modifications may be made without departing from the invention in its broader aspects. Therefore, it is intended in the appended claims to cover all such changes and modifications as fall within the true spirit and scope of this invention.

What is claimed as new and desired to be secured by Letters Patent of the United States is:

1. In combination, a rocket motor and an axial-thrust modulating rocket exhaust nozzle comprising:
   (a) a housing including a pair of end walls, a first and a second chamber within said housing, said first and second chambers being separated by a partition having an opening therethrough, one of said end walls having a rearwardly directed primary exhaust port therethrough communicating with said first chamber, said housing having a laterally directed secondary exhaust port therethrough communicating with said second chamber,
   (b) first means mounted within said housing for varying the effective exhaust area of said primary exhaust port, and
   (c) second means mounted within said housing for varying the effective exhaust area of said opening in inverse proportion to the variation of said primary exhaust port area, the geometrical configuration of said primary exhaust port, said first means, said opening, and said second means proivding a constant sum total effective exhaust area to effect various axial thrust levels without affecting the rocket motor combustion chamber pressure.

2. A combination as defined in claim 1 wherein said primary exhaust port and said opening are coaxial and wherein said first chamber includes a fuel burned therein.

3. A combination as defined in claim 2 wherein said first and second means jointly comprise a plug means mounted within said housing between and coaxial with said opening and said primary exhaust port for axial movement therebetween.

4. The combination as defined in claim 3 including remotely controlled actuating means for moving said plug member within said housing.

5. For use with a rocket motor, an axial-thrust modulating exhaust nozzle comprising;
   (a) a housing having an axially directed variable area primary exhaust port and a plurality of circumferentially spaced laterally directed variable area secondary exhaust ports,
   (b) a hollow plug member mounted within said housing to permit relative movement between said plug member and said housing, said plug member including a rearwardly directed aperture in flow communication with said primary exhaust port and a plurality of circumferentially spaced laterally directed apertures extending such that in one position said laterally directed apertures are in flow communication with said secondary exhaust ports and in another position said laterally directed apertures are divorced from said secondary exhaust ports, and
   (c) means responsive to said relative movement for varying the effective area of said primary exhaust port in inverse proportion to the degree of communication between said laterally directed apertures and said secondary exhaust ports, the sum total effective exhaust area of said nozzle always being equal to a fixed value to effect various axial thrust levels without affecting the rocket motor combustion chamber pressure.

6. An axial thrust modulating exhaust nozzle as defined in claim 5 wherein
   (a) said plug member includes a cylindrical side wall through which said laterally directed apertures extend and an end wall through which said rearwardly directed aperture extends, said laterally directed apertures are located so as to permit
      (i) simultaneous misalignment of said laterally directed apertures with said secondary exhaust ports causing obturation of each of said laterally directed apertures and of each of said secondary exhaust ports in a first position of said plug member,
      (ii) simultaneous partial alignment of each of said laterally directed apertures with a corresponding one of said secondary exhaust ports in a second position of said plug member, and
      (iii) simultaneous complete alignment of each of said laterally directed apertures with a corresponding one of said secondary exhaust ports in a third position of said plug member, and
   (b) said means comprising a projection extending from the rearward surface of said end wall towards said primary exhaust port to effect variation in the effective area of said primary exhaust port, said projection being spaced furthest from said primary exhaust port when said plug is in said first position to effect a maximum axial thrust level, said projection being closest to said primary exhaust port when said plug member is in said third position to effect a minimum axial thrust level and said projection being intermediate said furthest and said closest positions when said plug member is in said second position to effect an intermediate axial thrust level.

7. An axial-thrust modulating exhaust nozzle as defined in claim 6 wherein said secondary exhaust ports extend through said housing at an acute angle relative to its housing surface.

8. An axial-thrust modulating exhaust nozzle as defined in claim 6 including locking means for retaining said housing in any of said first, second, or third positions.

9. An axial-thrust modulating exhaust nozzle as defined in claim 6 including remote-controlled actuating means for effecting relative movement between said housing and said plug member.

10. An axial-thrust modulating exhaust nozzle as defined in claim 9 wherein said remote-controlled actuating means includes means for storing a programmed sequence of plug member actuation to effect automatic axial thrust variation.

11. For use with a rocket motor having a combustion chamber, an axial thrust modulating exhaust nozzle comprising:
    (a) a housing having an axially directed variable area primary exhaust port and secondary variable area exhaust means including a plurality of laterally directed secondary exhaust ports, said secondary exhaust ports being symmetrically located with respect to the longitudinal axis of said primary exhaust port, and
    (b) thrust control means for varying the effective exhaust area of said primary exhaust port and for varying the effective exhaust area of said secondary exhaust means inversely proportionately to the variation of area of said primary exhaust port, the geometrical configuration of said primary exhaust port, said secondary exhaust means and said thrust control means providing a constant sum total effective exhaust area to effect various axial thrust levels without affecting the rocket motor combustion chamber pressure,
said housing and said thrust control means being capable of having relative movement therebetween.

12. An axial thrust modulating exhaust nozzle as defined in claim 11 wherein said thrust control means is mounted within said housing.

13. An axial thrust modulating exhaust nozzle as defined in claim 12 wherein said secondary variable area exhaust means includes an axially directed secondary exhaust port spaced from and aligned with said primary exhaust port and wherein said thrust control means varies the effective exhaust area of said axially directed secondary exhaust port inversely proportionately to the variation of area of said primary exhaust port, said axially directed secondary exhaust port being in flow communication with said laterally directed secondary exhaust port.

14. A combination as defined in claim 13 wherein said secondary exhaust ports extend through said housing at an acute angle relative to the housing surface.

15. An axial thrust modulating exhaust nozzle as defined in claim 13 wherein said thrust control means is a plug member mounted within said housing between said axially directed primary and secondary exhaust ports for axial movement therebetween, each end of said plug member being adapted to cooperate with one of said axially directed exhaust ports to vary the effective exhaust area thereof.

16. An axial-thrust modulating exhaust nozzle as defined in claim 15 including remote-controlled actuating means for moving said plug member within said housing.

17. An axial-thrust modulating exhaust nozzle as defined in claim 15 wherein said remote-controlled actuating means includes means for storing a programmed sequence of plug member actuation to effect automatic axial thrust variation.

References Cited by the Examiner
UNITED STATES PATENTS

| | | |
|---|---|---|
| 2,509,238 | 5/1950 | Martin. |
| 2,933,889 | 4/1960 | Tolkmitt _____ 60—35.54 X |
| 3,177,655 | 4/1965 | White _____ 60—35.6 |

FOREIGN PATENTS

| | | |
|---|---|---|
| 860,754 | 12/1952 | Germany. |
| 723,160 | 2/1955 | Great Britain. |

MARK NEWMAN, *Primary Examiner.*

RALPH D. BLAKESLEE, *Examiner.*